(12) United States Patent
Saito

(10) Patent No.: US 9,959,492 B2
(45) Date of Patent: May 1, 2018

(54) IMAGE PROCESSING DEVICE

(71) Applicant: KONICA MINOLTA, INC., Chiyoda-ku, Tokyo (JP)

(72) Inventor: Daijiro Saito, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days. days.

(21) Appl. No.: 15/097,115

(22) Filed: Apr. 12, 2016

(65) Prior Publication Data
US 2016/0350630 A1 Dec. 1, 2016

(30) Foreign Application Priority Data

May 27, 2015 (JP) ................................ 2015-107515

(51) Int. Cl.
*G06K 15/00* (2006.01)
*H04N 1/40* (2006.01)
*G06K 15/02* (2006.01)
*G03G 15/00* (2006.01)

(52) U.S. Cl.
CPC .......... *G06K 15/188* (2013.01); *G03G 15/50* (2013.01); *G03G 15/5087* (2013.01); *G03G 15/6585* (2013.01); *G06K 15/186* (2013.01)

(58) Field of Classification Search
CPC .... G06K 15/188; G06K 15/186; G03G 15/50; G03G 15/5887; G03G 15/6585
USPC .......................................... 358/2.1, 1.15, 1.9
See application file for complete search history.

(56) References Cited

U.S. PATENT DOCUMENTS

| 7,652,794 B2 * | 1/2010 | Lee .......................... H04N 1/58 358/1.9 |
| 2013/0022753 A1 * | 1/2013 | Qiao .................. G03G 15/6585 427/469 |
| 2013/0101303 A1 * | 4/2013 | Kasai ................... G03G 15/205 399/45 |
| 2013/0250312 A1 * | 9/2013 | Miyazaki ............... G03G 15/01 358/1.1 |

FOREIGN PATENT DOCUMENTS

| JP | 2010263322 A | 11/2010 |
| JP | 2011145314 A | 7/2011 |
| JP | 2013246396 A | 12/2013 |
| JP | 2015094826 A | 5/2015 |
| JP | 2016074110 A | 5/2016 |

OTHER PUBLICATIONS

Japanese Office Action (and English translation thereof) dated May 17, 2017 issued in counterpart Japanese Application No. 2015-107515.

* cited by examiner

*Primary Examiner* — Quang N Vo
(74) *Attorney, Agent, or Firm* — Holtz, Holtz & Volek PC

(57) ABSTRACT

An image processing device supplies image data to be used in an image forming apparatus, the image processing device including a control unit configured to process the image data in accordance with an image quality processing parameter, wherein the control unit distinguishes between an overprint region in which overprinting of a coat layer of a transparent material is to be performed on a transfer medium and a non-overprint region in which the overprinting is not to be performed, and adjusts a difference in image quality between the overprint region and the non-overprint region by using the image quality processing parameter.

22 Claims, 3 Drawing Sheets

IMAGE PROCESSING DEVICE

The entire disclosure of Japanese Patent Application No. 2015-107515 filed on May 27, 2015 including description, claims, drawings, and abstract are incorporated herein by reference in its entirety.

BACKGROUND OF THE INVENTION

Field of the Invention

The present invention relates to an image processing device that supplies image data to be used in an image forming apparatus that is capable of performing overprinting of a transparent-material coat layer in a post-processing stage.

Description of the Related Art

In the printing market, overprinting of varnish may be performed on a printed image, to increase the glossiness, the water resistance, and the abrasion resistance of the image, for example.

JP 2011-145314 A discloses post-processing to be performed with a varnish coater on printed material that is output from an image forming apparatus, for example. During the post-processing, color reproducibility changes due to fluctuations in glossiness, and, as a result, desired color shades are not obtained. JP 2011-145314 A discloses that, when varnish coating is performed, the above described problem is solved by adjusting the fixing conditions at the fixing unit so that the thermal energy to be applied to the unfixed toner image on a recording medium becomes larger than that in a case where varnish coating is not performed, or by correcting the color intensity of each predetermined color.

According to JP 2011-145314 A, the fixing conditions and the intensity of each color are changed depending on whether overall coating is performed. However, effective varnish coating is not always overall coating, but may be spot coating by which printed material is partially coated with varnish, to improve design properties for a wide variety of uses.

However, this coating might bring about the following situations.

Colors become darker (particularly, red becomes darker)
When a thick coat is formed, the linewidth looks different.
When a thick coat is formed, the screen LPI (Lines Per Inch) looks different.

Consequently, a difference is caused in the same image (in colors, lines, and characters) depending on whether coating is performed, and the resultant image gives viewers a feeling of strangeness.

Where the method according to JP 2011-145314 A is employed, the overall coating process changes. Therefore, the difference between a portion coated by spot coating and a non-coated portion cannot be eliminated.

SUMMARY OF THE INVENTION

The present invention has been made in view of the above circumstances, and an object thereof is to provide an image processing device that can produce printed material without any strangeness between an overprint region and a non-overprint region.

To achieve the abovementioned object, according to an aspect, an image processing device that supplies image data to be used in an image forming apparatus reflecting one aspect of the present invention comprises a control unit configured to process the image data in accordance with an image quality processing parameter, wherein the control unit distinguishes between an overprint region in which overprinting of a coat layer of a transparent material is to be performed on a transfer medium and a non-overprint region in which the overprinting is not to be performed, and adjusts a difference in image quality between the overprint region and the non-overprint region by using the image quality processing parameter.

In an image processing device according to another aspect of the invention, the control unit preferably stores, into a storage unit, a result of the distinction between the overprint region in which the overprinting of the coat layer of the transparent material is to be performed and the non-overprint region in which the overprinting is not to be performed, and adjusts the difference in image quality between the overprint region and the non-overprint region in accordance with the result of the distinction stored in the storage unit.

In an image processing device according to another aspect of the invention, the control unit preferably reduces the difference in image quality between the overprint region and the non-overprint region.

In an image processing device according to another aspect of the invention, the control unit preferably increases the difference in image quality between the overprint region and the non-overprint region.

In an image processing device according to another aspect of the invention, the control unit preferably adjusts the difference in image quality between the overprint region and the non-overprint region by adjusting at least one of the image quality processing parameters including a linewidth adjustment parameter, an image contour enhancement intensity parameter, and a screen LPI parameter.

In an image processing device according to another aspect of the invention, the control unit preferably adjusts the difference in image quality between the overprint region and the non-overprint region by adjusting at least one of the image quality processing parameters including a linewidth adjustment parameter, a color conversion parameter, and a screen LPI parameter.

In an image processing device according to another aspect of the invention, the control unit preferably adjusts the difference in image quality between the overprint region and the non-overprint region, to locally increase a total amount of toner at a time of image formation.

In an image processing device according to another aspect of the invention, the control unit preferably changes the image quality processing parameter in accordance with at least one of the transparent material, conditions for hardening the transparent material, and a thickness of the transfer medium.

In an image processing device according to another aspect of the invention, the control unit preferably changes the image quality processing parameter in accordance with an attribute of an image to be printed on the transfer medium.

In an image processing device according to another aspect of the invention, in part of the overprint region, the control unit preferably increases the difference in image quality between the overprint region and the non-overprint region.

In an image processing device according to another aspect of the invention, in a peripheral portion in the overprint region, the control unit preferably increases the difference in image quality between the overprint region and the non-overprint region.

In an image processing device according to another aspect of the invention, the transparent material is preferably varnish.

In an image processing device according to another aspect of the invention, the image processing device is preferably included in the image forming apparatus.

In an image processing device according to another aspect of the invention, the image processing device is preferably installed outside the image forming apparatus.

In an image processing device according to another aspect of the invention, the image processing device is preferably connected to the image forming apparatus via a network.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of the present invention will be described with reference to the drawings. However, the scope of the invention is not limited to the illustrated examples.

Figure 1:
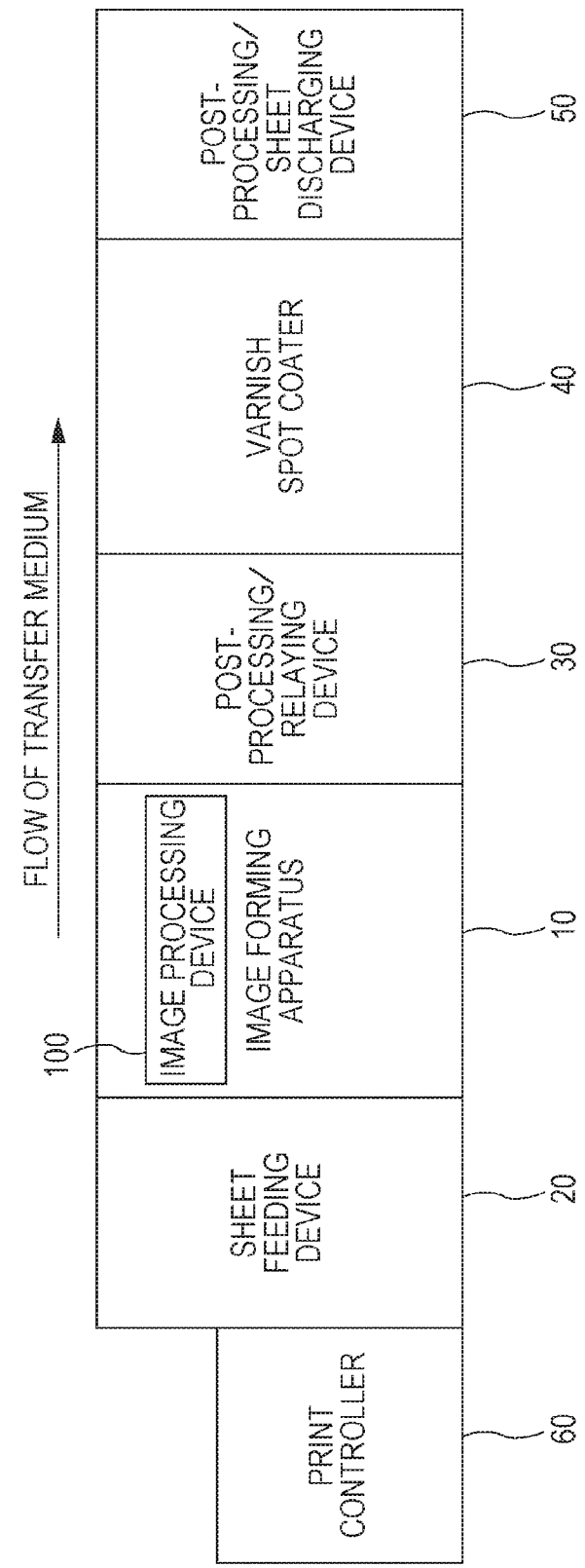
FIG. 1 is a diagram schematically showing an image forming system including an image processing device according to an embodiment of the present invention.

FIG. 1 is a diagram schematically showing the configuration of an image forming system 1 including an image processing device according to an embodiment of the present invention.

In the image forming system 1, a sheet feeding device 20, an image forming apparatus 10, a post-processing/relaying device 30, a varnish spot coater 40, and a post-processing/sheet discharging device 50 are mechanically and electrically connected in this order. Although the image forming system is formed with the image forming apparatus 10 and other devices in this embodiment, the image forming apparatus 10 may serve as the image forming apparatus main unit, and form an image forming apparatus in conjunction with the other devices such as a varnish spot coater.

The sheet feeding device 20 stores transfer media such as paper sheets or the like on which image formation is to be performed, and supplies and conveys a paper sheet in response to a request from the image forming apparatus 10 in preparation for image formation.

In the image forming apparatus 10, a printing unit 11 (shown in FIG. 2) performs printing on a transfer medium based on image data. At this point of time, the image data is subjected to image processing performed by the image processing device 100. The transfer media may be paper or may be some other material.

The image data may be generated by reading a document with a reading device (not shown) included in the image forming apparatus 10, or may be generated outside and be received via a network or the like.

The post-processing/relaying device 30 is a post-processing device. The post-processing/relaying device 30 can reverse a transfer medium on which printing has been performed by the image forming apparatus 10, and can also stack a predetermined number of transfer media. A reversed transfer medium can be conveyed directly to the sheet discharging side of the relaying device 30. Stacked transfer media can be conveyed to the sheet discharging side of the relaying device 30 at a predetermined time.

The varnish spot coater 40 varnishes a paper sheet on which printing has been performed in accordance with settings. Varnish may be applied to the entire print area, or may be applied to part of the print area. The settings may be determined by the image forming apparatus 10 to set the conditions for printing, or may be included in the conditions for printing image data. Varnish is equivalent to the transparent material of an embodiment of the invention, and the coat layer formed with the transparent material is equivalent to the transparent-material coat layer of an embodiment of the invention. It should be noted that the transparent material is not limited to varnish in the present invention, as long as the transparent material can form a transparent coat layer.

The image processing device 100 of the image forming apparatus 10 distinguishes between the region in which overprinting of varnish is to be performed and the region in which overprinting of varnish is not to be performed. In a case where the image forming apparatus 10 determines the settings, for example, the image processing device 100 distinguishes the regions from each other. In a case where the settings are included in image data, the image processing device 100 distinguishes the regions from each other by accepting the image data.

The post-processing/sheet discharging device 50 is a post-processing device, and may include one or more post-processing units. The post-processing/sheet discharging device 50 may discharge a transfer medium without any post-processing performed on the transfer medium.

A print controller 60 can receive image data and the like generated by an application program in an external device, for example. The method of generating image data is not limited to any particular method.

Image data is received by the print controller 60, and is loaded into and stored in a storage unit (HDD) 61 in the print controller 60. The image data is transmitted to the image processing device 100. If a varnish setting is included in the image data, the details of the setting are transmitted from the print controller 60 to the varnish spot coater 40, and overprinting of varnish is performed on a transfer medium.

In this embodiment, the image forming apparatus 10 includes the image processing device 100. In the present invention, however, the image processing device 100 may be provided separately from the image forming apparatus 10, or the image processing device 100 may be electrically connected to the image forming apparatus 10, the varnish spot coater 40, and the like via a network.

Figure 2:
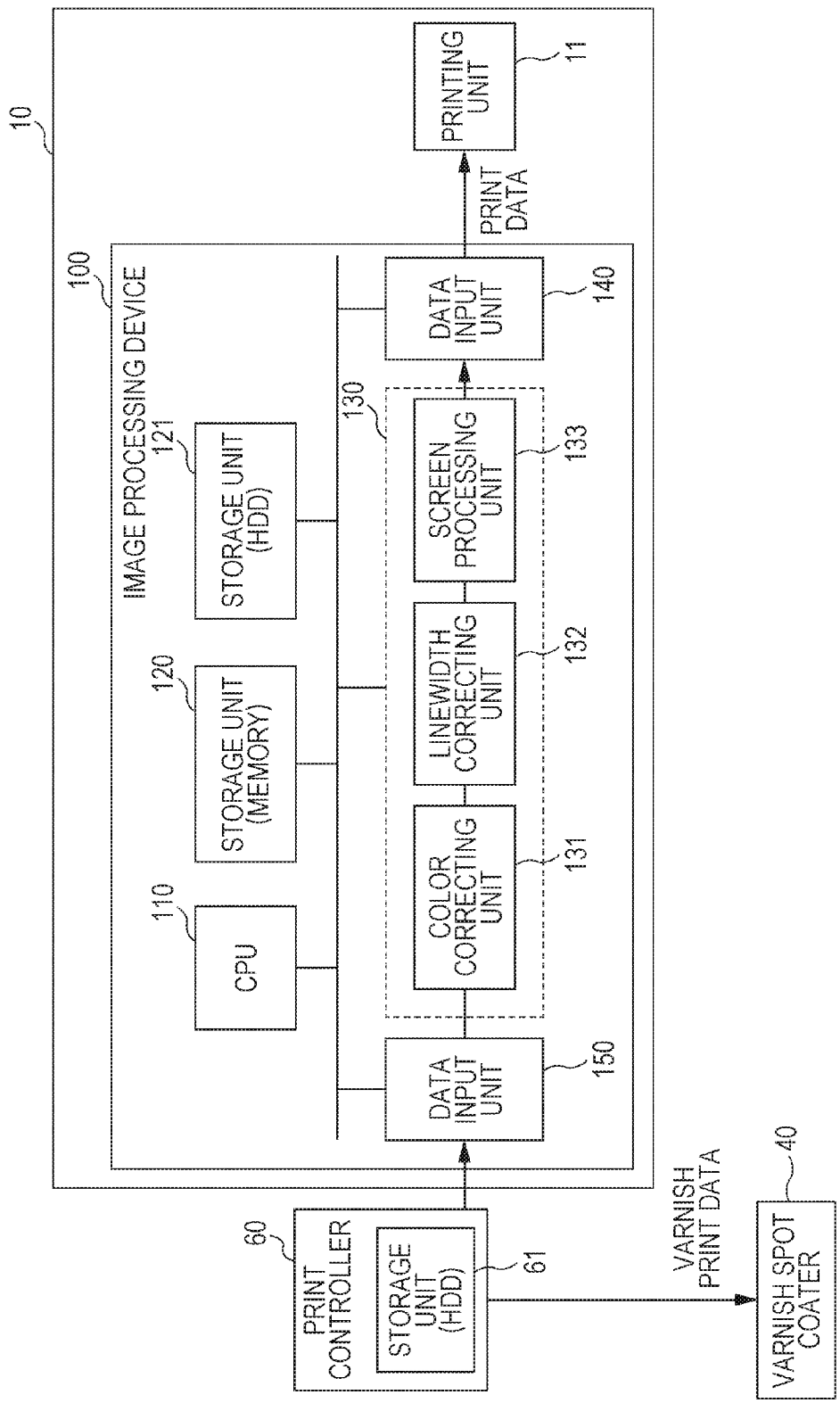
FIG. 2 is a diagram partially showing the control block of the image forming system including the image processing device according to the embodiment.

Referring now to the control blocks shown in FIG. 2, part of the image forming system 1 is described.

The image forming apparatus 10 includes a CPU 110 that controls the image processing device 100. The CPU 110 performs a predetermined operation in accordance with a program, to control the image processing device 100. In this embodiment, the CPU 110 controls the entire image forming apparatus 10. In the present invention, the control unit that control s the entire image forming apparatus 10 may differ from the control unit that controls the image processing device 100.

In a case where overprinting of varnish is performed, the CPU 110 distinguishes between the overprint region in which overprinting of the transparent-material coat layer is to be performed and the non-overprint region in which any overprinting is not to be performed in the print area. The result of the determination is stored into a storage unit (memory) 120 or a storage unit (HDD) 121 that will be described later. In accordance with the determination result temporarily stored in the storage unit (memory) 120 or the storage unit (HDD) 121, the CPU 110 further performs a process to adjust a difference in image quality between the overprint region and the non-overprint region using image quality processing parameters. In this manner, the CPU 110 and the program for operating the CPU 110 constitute the control unit of an embodiment of the invention.

The image processing device 100 includes the storage unit (memory) 120 formed with a memory, and the storage unit (HDD) 121 formed with an HDD. Programs, setting data, image data, and the like are stored in the storage unit (memory) 120 and the storage unit (HDD) 121. The setting data includes: a setting for determining whether to reduce the difference in image quality or whether to increase the difference in image quality when the difference in image quality is adjusted; a setting of image quality processing parameters for performing the adjustment; a setting of a local increase in a total amount of toner at a time of image formation; a setting for changing image quality processing parameters in accordance with at least one of the transparent material, the hardening conditions (the heating temperature and the heating time) for the transparent material, and the thickness of the transfer medium at a time of adjustment of image quality processing parameters; and a setting of a region (such as a peripheral region) in the overprint region on which image quality difference adjustment is to be performed.

These pieces of setting data are preferably stored in a nonvolatile storage unit among the storage units.

The image quality processing parameters preferably include at least one of a linewidth adjustment parameter, a color conversion parameter (including an image contour enhancement intensity parameter), and a screen LPI parameter.

The image processing device 100 also includes a data input unit 150 that receives image data from the print controller 60. The data input unit 150 is electrically connected to the input side of an image quality processing unit 130. The image data can be stored into the storage unit (memory) 120 or the storage unit (HDD) 121.

The image quality processing unit 130 includes a color correcting unit 131, a linewidth correcting unit 132, and a screen processing unit 133. A data input unit 140 is electrically connected to the output side of the image quality processing unit 130, and the printing unit 11 is electrically connected to the output side of the data input unit 140.

The image quality processing unit 130 can perform image quality processing on the image data obtained by the data input unit 150 or the image data stored in the storage unit (memory) 120 or the storage unit (HDD) 121. The color correcting unit 131 performs processing such as color conversion and contour enhancement. The linewidth correcting unit 132 adjusts linewidth. The screen processing unit 133 performs screen processing in accordance with the screen LPI or the like.

The printing unit 11 includes an image forming unit and a conveying unit that conveys the transfer medium. The image forming unit prints an image on the transfer medium being conveyed.

The print controller 60 is controllably connected to the varnish spot coater 40, and varnish print data is transmitted from the print controller 60 to the varnish spot coater 40. The varnish spot coater 40 performs overprinting of spot varnish in some region in the print area in accordance with the varnish print data, and conducts a predetermined hardening process (at a predetermined temperature and for a predetermined heating time) on the varnish, to complete the image processing.

Figure 3:
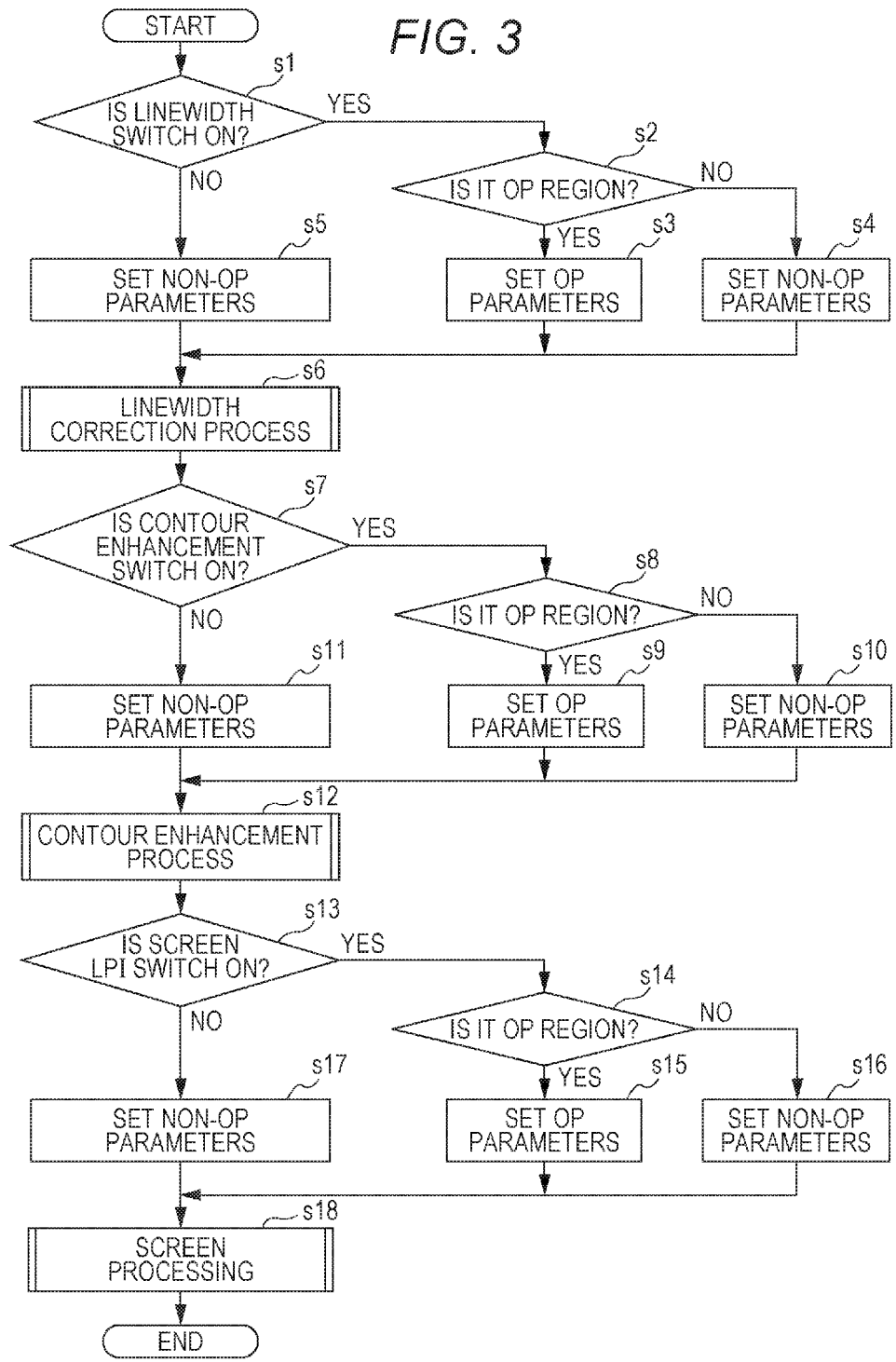
FIG. 3 is a flowchart showing image processing procedures according to the embodiment.

Referring now to the flowchart in FIG. 3, the procedures in image processing according to an embodiment of the present invention are described. The procedures described below are carried out under the control of a control unit. Use and selection of image quality processing parameters are set in advance, and image quality is adjusted in accordance with the settings.

When processing is started, a check is made to determine whether a linewidth correction switch is on (step s1). If the linewidth correction switch is not on (No in step s1), non-overprint (hereinafter written as non-OP) parameters are set (step s5). If the linewidth correction switch is on (Yes in step s1), a check is made to determine whether the current region is an overprint (hereinafter written as OP) region (step s2). This check to determine whether the current region is an OP region is performed in the print area. If the current region is an OP region (Yes in step s2), OP parameters are set (step s3). If the current region is not an OP region (No in step s2), the non-overprint parameters are set (step s4).

After step s3, s4, or s5, a linewidth correction process is performed in accordance with the parameters (step s6), and a check is then made to determine whether a contour enhancement switch is on (step s7).

If the contour enhancement switch is not on (No in step s7), the non-overprint parameters are set (step s11).

If the contour enhancement switch is on (Yes in step s7), a check is made to determine whether the current region is an OP region (step s8). This check to determine whether the current region is an OP region is performed in the print area. If the current region is an OP region (Yes in step s8), the OP parameters are set (step s9). If the current region is not an OP region (No in step s8), the non-overprint parameters are set (step s10).

After step s9, s10, or s11, a contour enhancement process is performed in accordance with the parameters (step s12), and a check is then made to determine whether a screen LPI switch is on (step s13).

If the screen LPI switch is not on (No in step s13), the non-overprint parameters are set (step s17).

If the screen LPI switch is on (Yes in step s13), a check is made to determine whether the current region is an OP region (step s14). This check to determine whether the current region is an OP region is performed in the print area. If the current region is an OP region (Yes in step s14), the OP parameters are set (step s15). If the current region is not an OP region (No in step s14), the non-overprint parameters are set (step s16).

After step s15, s16, or s17, screen processing is performed (step s18), and the image processing then comes to an end.

The OP parameters and the non-overprint parameters are set and stored into a storage unit in advance. When setting is performed, the OP parameters or the non-overprint parameters can be read out and used.

Table 1 shows examples of the respective set parameters.

TABLE 1

| Overprint region or not? | Adjustment item | | |
|---|---|---|---|
| | Linewidth correction | Contour enhancement | Screen LPI |
| In OP region | Smaller linewidth than normal | Weaker enhancement than normal | Larger LPI |
| Non-OP region | Normal linewidth | Normal enhancement | Normal LPI |

As shown in Table 1, details of adjustment according to the respective parameters are specified for an OP region and a non-OP region.

In the linewidth correction, the linewidth in an OP region is made smaller than normal, and normal correction is performed in a non-OP region. In the contour enhancement, weaker enhancement than normal is performed in an OP region, and normal enhancement is conducted in a non-OP region. As for the screen LPI, the LPI is made higher than normal in an OP region, and the normal LPI is set in a non-OP region. Through the above parameter adjustment, the difference in image quality between an OP region and a non-OP region becomes smaller, and less strangeness will be felt between the two regions. Specifically, changes in color due to the coat, changes in the visibility of the line width, changes in the visibility of the screen pattern, and the like are reduced.

Switching on and off of each adjustment item may be set by a user, and at least one of the items of adjustment can be selectively performed. The settings are stored in the storage unit (memory) 120 or the storage unit (HUD) 121. The device does not need to have three options, and may be allowed to perform one or two kinds of adjustment or may be allowed to perform four or more kinds of adjustment.

In the above described example, normal adjustment parameters are set in a non-OP region while different adjustment parameters from normal adjustment parameters are set in an OP region. However, different adjustment parameters from normal adjustment parameters may be set in a non-OP region while normal adjustment parameters are set in an OP region. Alternatively, different adjustment parameters from normal adjustment parameters may be set in both regions.

In the above described example, the difference in image quality is reduced. However, the difference may be regarded as a feature of varnish coating, and parameters for increasing the difference in image quality may be used, to emphasize the effect of the design of the coat. Specifically, changes in color due to the coat, changes in the visibility of the line width, changes in the visibility of the screen pattern, and the like are enhanced.

In an OP region, the linewidth is made greater than normal in the linewidth correction, stronger enhancement than normal is conducted in the color conversion, and the screen LPI is made smaller. In this manner, the difference in image quality between the OP region and a non-OP region can be increased.

For example, transparent varnish has a lens effect, and is used for forming a lenticular lens. Depending on the shape of the region, the screen LPI appears to be small due to the lens effect. In view of this, the screen LPI is made even smaller, to increase the lens effect.

In the parameter adjustment, one of the parameters may be set to reduce the difference, while the other parameters may be set to increase the difference.

In the OP parameter settings, the portion of a varnish spot on which image quality adjustment is to be performed is determined beforehand, and the image quality adjustment can be performed on the portion. For example, the image quality adjustment can be performed on a peripheral portion in a varnish spot, as in image contour enhancement for a varnish spot. At a time of image quality adjustment, color conversion parameters can also be changed to locally increase a total amount of toner in an OP region. That is, varnish coating can have an effect to increase smear resistance.

Specifically, a portion insufficiently fixed due to excess toner during an electrophotographic process is coated in a post-processing stage after printing. Thus, smear (scratches and smudge on the surface) is not caused. In the case of normal color printing, a restriction is put on the total amount of toner in the same portion, to maintain fixing properties. However, it is a known fact that a more expressive gray scale can be obtained if the restriction can be lifted.

In view of this, the total amount of toner in a region to be coated is allowed to be reduced. This total amount of toner is specifically a change in the color conversion parameter.

In setting the parameters, the amount of adjustment of each parameter setting may be changed in accordance with the material of the varnish, the hardening conditions, the thickness of the transfer medium, and the attribute of the image (the attribute indicating the type of the image, such as a photograph, a character, or a graphic).

Although the present invention has been described based on the above embodiment, the embodiment can be appropriately changed without departing from the scope of the present invention.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An image processing device that supplies image data to be used in an image forming apparatus, the image processing device comprising:
    a data input unit that receives image data;
    a processor that executes a program stored in a memory to perform operations including:
        distinguishing, in the received image data, between an overprint region in which overprinting of a coat layer of a transparent material is to be performed on a recording medium and a non-overprint region in which the overprinting is not to be performed; and
        performing image quality processing to correct the received image data by adjusting a difference in image quality between the overprint region and the non-overprint region by adjusting at least one of a plurality of image quality processing parameters, the image quality processing parameters including a linewidth adjustment parameter and an image contour enhancement intensity parameter; and
    a data output unit which outputs the image data corrected by the processor.

2. The image processing device according to claim 1, wherein the processor executes the program stored in the memory to perform operations further including storing, in the memory, a result of the distinguishing between the overprint region and the non-overprint region, and
    wherein the processor adjusts the difference in image quality between the overprint region and the non-overprint region in accordance with the result of the distinguishing stored in the memory.

3. The image processing device according to claim 1, wherein the processor reduces the difference in image quality between the overprint region and the non-overprint region.

4. The image processing device according to claim 1, wherein the processor increases the difference in image quality between the overprint region and the non-overprint region.

5. The image processing device according to claim 1, wherein the image quality processing performed by the processor further includes adjusting the difference in image quality between the overprint region and the non-overprint region by adjusting a screen LPI parameter.

6. The image processing device according to claim 4, wherein the image quality processing performed by the processor further includes adjusting the difference in image quality between the overprint region and the non-overprint region by adjusting at least one of a color conversion parameter or a screen LPI parameter.

7. The image processing device according to claim 1, wherein the image quality processing performed by the processor adjusts the difference in image quality between the overprint region and the non-overprint region, to locally increase a total amount of toner at a time of image formation.

8. The image processing device according to claim 1, wherein the image quality processing performed by the processor adjusts the difference in image quality by changing the at least one of the plurality of image processing parameters in accordance with at least one of the transparent material, conditions for hardening the transparent material, or a thickness of the recording medium.

9. The image processing device according to claim 1, wherein the processor adjusts the difference in image quality by changing the at least one of the plurality of image processing parameters in accordance with an attribute of an image to be printed on the recording medium.

10. The image processing device according to claim 1, wherein, in part of the overprint region, the processor adjusts the difference in image quality to increase the difference in image quality between the overprint region and the non-overprint region.

11. The image processing device according to claim 10, wherein, in a peripheral portion in the overprint region, the processor adjusts the difference in image quality to increase the difference in image quality between the overprint region and the non-overprint region.

12. The image processing device according to claim 1, wherein the transparent material is varnish.

13. An image forming apparatus comprising:
the image processing device according to claim 1, which is included in the image forming apparatus; and
a printer which performs printing on the recording medium based on the image data output by the data output unit.

14. The image processing device according to claim 1, wherein the image processing device is installed outside the image forming apparatus.

15. The image processing device according to claim 14, wherein the image processing device is connected to the image forming apparatus via a network.

16. The image processing device according to claim 1, wherein the processor adjusts the difference in image quality by adjusting the linewidth adjustment parameter such that a linewidth of the overprint region is smaller than a linewidth of the non-overprint region.

17. The image processing device according to claim 1, wherein the processor adjusts the difference in image quality by adjusting the linewidth adjustment parameter such that a linewidth of the overprint region is larger than a linewidth of the non-overprint region.

18. The image processing device according to claim 1, wherein the processor adjusts the difference in image quality by adjusting the contour enhancement intensity parameter such that a degree of the contour enhancement of the overprint region is weaker than a degree of the contour enhancement of the non-overprint region.

19. The image processing device according to claim 1, wherein the processor adjusts the difference in image quality by adjusting the contour enhancement intensity parameter such that a degree of the contour enhancement of the overprint region is stronger than a degree of the contour enhancement of the non-overprint region.

20. An image forming system comprising:
the image processing device of claim 1;
an image forming apparatus which includes a printer which performs printing on the recording medium based on the image data output by the data output unit of the image processing device; and
a varnish spot coater which performs varnish spot coating in the overprint region on the recording medium on which printing has been performed by the image forming apparatus.

21. An image processing device that supplies image data to be used in an image forming apparatus, the image processing device comprising:
a data input unit that receives image data;
a processor that executes a program stored in a memory to perform operations including:
distinguishing, in the received image data, between an overprint region in which overprinting of a coat layer of a transparent material is to be performed on a recording medium and a non-overprint region in which the overprinting is not to be performed; and
performing image quality processing to correct the received image data by adjusting a difference in image quality between the overprint region and the non-overprint region by adjusting an image quality processing parameter in accordance with at least one of the transparent material or conditions for hardening the transparent material; and
a data output unit which outputs the image data corrected by the processor.

22. An image forming system comprising:
the image processing device of claim 21;
an image forming apparatus which includes a printer which performs printing on the recording medium based on the image data output by the data output unit of the image processing device; and
a varnish spot coater which performs varnish spot coating in the overprint region on the recording medium on which printing has been performed by the image forming apparatus.

* * * * *